US009127723B2

(12) United States Patent
Fujiwara (10) Patent No.: US 9,127,723 B2
(45) Date of Patent: Sep. 8, 2015

(54) ONE-WAY CLUTCH AND POWER GENERATING APPARATUS

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 265 days.

(21) Appl. No.: 13/865,543

(22) Filed: Apr. 18, 2013

(65) Prior Publication Data

US 2013/0283949 A1 Oct. 31, 2013

(30) Foreign Application Priority Data

Apr. 27, 2012 (JP) ................................. 2012-102195

(51) Int. Cl.
| F16D 15/00 | (2006.01) |
| F16H 35/00 | (2006.01) |
| F16D 41/067 | (2006.01) |
| F16C 33/46 | (2006.01) |
| F16C 33/54 | (2006.01) |
| F16D 41/06 | (2006.01) |

(52) U.S. Cl.
CPC ............ *F16D 15/00* (2013.01); *F16C 33/4664* (2013.01); *F16C 33/4676* (2013.01); *F16C 33/548* (2013.01); *F16D 41/067* (2013.01); *F16H 35/00* (2013.01); *F16D 2041/0608* (2013.01); *Y10T 74/19614* (2015.01)

(58) Field of Classification Search
CPC ..... F16D 15/00; F16D 41/064; F16D 41/066; F16D 41/067; F16H 35/02; F16H 2035/005
See application file for complete search history.

(56) References Cited

U.S. PATENT DOCUMENTS

| 409,308 | A | | 8/1889 | Sharpneck |
| 1,238,309 | A | * | 8/1917 | Lockwood .................... 384/574 |
| 1,250,595 | A | * | 12/1917 | Knoth ............................ 384/574 |
| 3,095,954 | A | * | 7/1963 | Ferris ........................ 192/45.014 |
| 3,877,555 | A | * | 4/1975 | Rist ........................... 192/45.014 |
| 4,787,490 | A | | 11/1988 | Lederman et al. |
| 5,704,458 | A | | 1/1998 | Neuwirth et al. |

(Continued)

FOREIGN PATENT DOCUMENTS

| DE | 10 2011 082108 A1 | 3/2013 |
| GB | 2 028 934 A | 3/1980 |

(Continued)

OTHER PUBLICATIONS

Apr. 3, 2015 Search Report issued in European Patent Application No. 13 16 5113.

*Primary Examiner* — Jacob S Scott
(74) *Attorney, Agent, or Firm* — Oliff PLC (57) ABSTRACT

A one-way clutch is arranged between an output shaft of a speed increaser and a drive shaft of a generator in a wind power generator. The one-way clutch includes an inner ring, an outer ring, a plurality of rollers arranged between an outer periphery of the inner ring and an inner periphery of the outer ring, a cage that retains the rollers at predetermined intervals in a circumferential direction, and a plurality of elastic members that is attached to the cage and that urges the corresponding rollers in one direction. The cage includes a pair of axially facing annular portions and a plurality of cage bar portions formed separately from the annular portions, both axial end portions of each of the cage bar portions being fitted to the respective annular portions.

13 Claims, 11 Drawing Sheets

(56) References Cited

U.S. PATENT DOCUMENTS

2002/0148696 A1* 10/2002 Enomoto et al. ............. 192/45
2012/0045335 A1    2/2012 Heidenreich et al.
2012/0279817 A1* 11/2012 Zhou et al. ............. 192/45.001

FOREIGN PATENT DOCUMENTS

| JP | A-09-506154  | 6/1997  |
| JP | A-2007-232186 | 9/2007  |
| JP | A-2011-198354 | 10/2011 |

* cited by examiner

ONE-WAY CLUTCH AND POWER GENERATING APPARATUS

INCORPORATION BY REFERENCE

The disclosure of Japanese Patent Application No. 2012-102195 filed on Apr. 27, 2012 including the specification, drawings and abstract, is incorporated herein by reference in its entirety.

BACKGROUND OF THE INVENTION

1. Field of the Invention

The invention relates to a one-way clutch and a power generating apparatus.

2. Description of Related Art

There are known some conventional wind power generators in which a main shaft connected to blades is rotated upon reception of wind force and the speed of rotation transmitted from the main shaft is increased by a speed increaser to drive a generator (for example, see Japanese Patent Application Publication No. 2007-232186 (JP 2007-232186 A)). In such wind power generators, there is a problem that the speed of the rotation transmitted to the generator from the blades via the speed increaser changes due to a change in wind speed or wind direction and, as a result, power generation efficiency decreases.

Thus, the applicant has already suggested a wind power generator in which a one-way clutch is arranged between a speed increaser and a generator in order to improve power generation efficiency (Japanese Patent Application No. 2011-198354, and, hereinafter, referred to as "related invention"). In the wind power generator, even when the wind speed, or the like, changes and the speed of rotation of the main shaft reduces, the drive shaft of the generator continues rotating by inertia without a steep reduction in speed by interrupting connection between the output shaft of the speed increaser and the drive shaft of the generator with the use of the one-way clutch, so the average rotation speed of the drive shaft increases, and it is possible to improve power generation efficiency.

Figure 11:
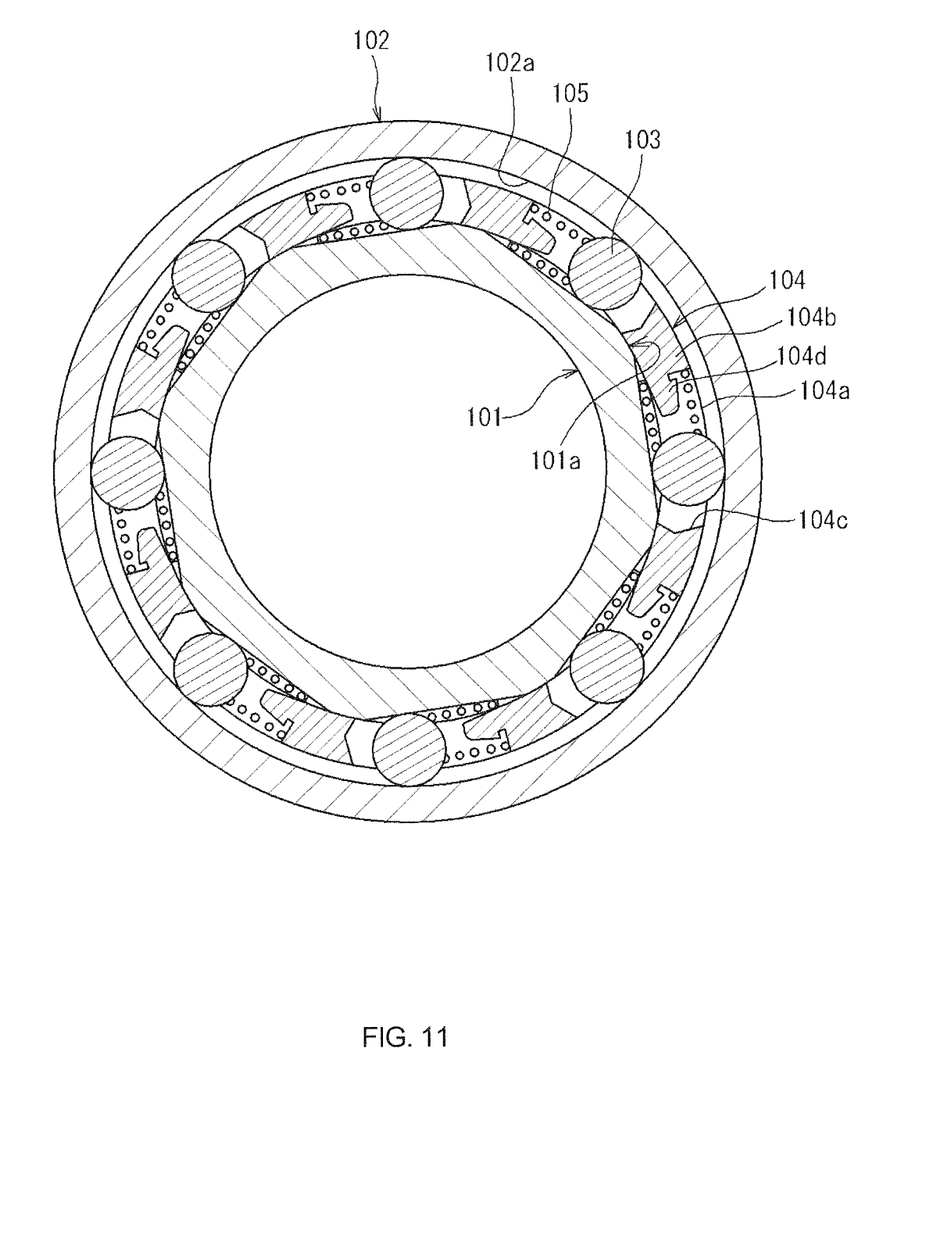
FIG. 11 is a sectional view that shows a conventional one-way clutch.

As shown in FIG. 11, the one-way clutch according to the related invention includes an inner ring 101, an outer ring 102, a plurality of rollers 103, an annular cage 104 and a plurality of elastic members 105. The rollers 103 are arranged between an outer periphery 101a of the inner ring 101 and an inner periphery 102a of the outer ring 102. The cage 104 retains the rollers 103 at predetermined intervals in the circumferential direction. The elastic members 105 elastically urge the corresponding rollers in one direction. The cage 104 is integrally formed of a pair of axially facing annular portions 104a and a plurality of cage bar portions 104b that couples both annular portions 104a. Each of a plurality of pockets 104c is defined by both annular portions 104a and any adjacent two cage bar portions 104b, and each roller 103 and each elastic member 105 are individually accommodated in a corresponding one of the pockets 104c. In addition, each cage bar portion 104b is formed integrally with a protrusion 104d that serves as a guide at the time when the corresponding elastic member 105 is arranged in the corresponding pocket 104c.

The cage 104 that constitutes the one-way clutch according to the related invention has a complex shape such that the pockets 104c are formed by the annular portions 104a and the cage bar portions 104b and the protrusions 104d are respectively formed on the cage bar portions 104b. Therefore, it is not preferable to employ a method of manufacturing the cage 104 as an integral unit by machining, because manufacturing cost increases. In addition, a method of manufacturing an integral unit through injection molding of a synthetic resin material is conceivable; however, the cage 104 that is used in a power generating apparatus has a large size, so it is difficult to mold such the large-sized cage 104 with the use of an injection molding machine.

SUMMARY OF THE INVENTION

It is an object of the invention to provide a one-way clutch, for which it is possible to easily manufacture a cage, and a power generating apparatus.

A one-way clutch according to the invention includes: an inner ring; an outer ring; a plurality of rollers that is arranged between an outer periphery of the inner ring and an inner periphery of the outer ring, that allows the inner and outer rings to rotate together with each other in a state where the rollers are pressed against the inner and outer rings and are engaged with the inner and outer rings, and that allows the inner and outer rings to rotate relative to each other in a state where the rollers are disengaged from the inner and outer rings; a cage that retains the rollers at predetermined intervals in a circumferential direction; and a plurality of elastic members that is attached to the cage and that urges the corresponding rollers in a direction in which the rollers are pressed against the inner and outer rings. The cage includes a pair of axially facing annular portions, and a plurality of cage bar portions formed separately from the annular portions, both axial end portions of each of the cage bar portions being fitted to the respective annular portions.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
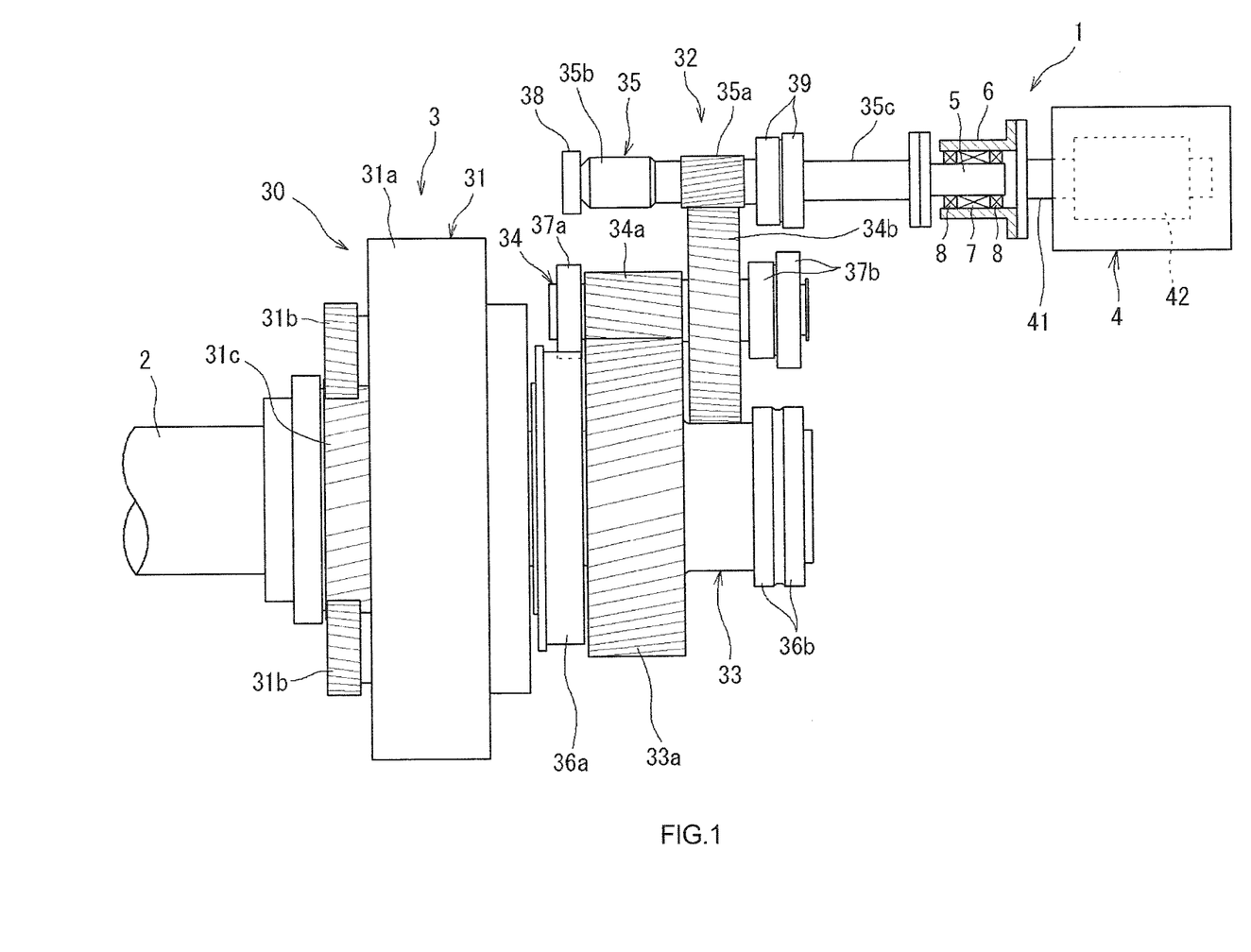
FIG. 1 is a schematic side view that shows a wind power generator that includes a one-way clutch according to a first embodiment of the invention.

Hereinafter, embodiments of the invention will be described with reference to the accompanying drawings. FIG. 1 is a schematic side view that shows a wind power generator that includes a one-way clutch according to a first embodiment of the invention. The wind power generator (power generating apparatus) 1 includes a main shaft 2, a speed increaser 3 and a generator 4. The main shaft 2 rotates upon reception of wind force (external force). The speed increaser 3 is coupled to the main shaft 2. The generator 4 is coupled to the speed increaser 3. The generator 4 is driven while the speed of rotation of the main shaft 2 is increased by the speed increaser 3.

For example, blades (not shown) are coupled to the distal end portion of the main shaft 2 so as to be rotatable together with the main shaft 2. When the blades receive wind force, the blades rotate together with the main shaft 2. The generator 4 includes a drive shaft 41, a rotor 42, a stator (not shown), and the like. The drive shaft 41 rotates upon reception of rotation of which the speed has been increased by the speed increaser 3. The rotor 42 is incorporated in the generator 4. The rotor 42 is coupled to the drive shaft 41 so as to be rotatable together with the drive shaft 41. Electric power is generated as the rotor 42 is driven due to the rotation of the drive shaft 41.

The speed increaser 3 includes a rotation transmission mechanism 30 that receives rotation of the main shaft 2 and increases the speed of the rotation. The rotation transmission mechanism 30 includes a planet gear mechanism 31 and a high-speed gear mechanism 32. The high-speed gear mechanism 32 receives rotation of which the speed has been increased by the planet gear mechanism 31, and further increases the speed of the rotation. The planet gear mechanism 31 includes an internal gear (ring gear) 31a, a plurality of planet gears 31b, and a sun gear 31c. The planet gears 31b are held by a planet carrier (not shown) that is coupled to the main shaft 2 so as to be rotatable together with the main shaft 2. The sun gear 31c is in mesh with the planet gears 31b. Thus, when the planet carrier rotates together with the main shaft 2, the sun gear 31c rotates via the planet gears 31b, and the rotation is transmitted to a low-speed shaft 33 of the high-speed gear mechanism 32.

The high-speed gear mechanism 32 includes the low-speed shaft 33, an intermediate shaft 34 and an output shaft 35. The low-speed shaft 33 has a low-speed gear 33a. The intermediate shaft 34 has a first intermediate gear 34a and a second intermediate gear 34b. The output shaft 35 has a high-speed gear 35a. The low-speed shaft 33 is formed of a large-sized rotary shaft of which the diameter is, for example, about 1 m, and is arranged concentrically with the main shaft 2. Respective axial end portions of the low-speed shaft 33 are rotatably supported by roller bearings 36a, 36b. The intermediate shaft 34 is arranged above the low-speed shaft 33. Respective axial end portions of the intermediate shaft 34 are rotatably supported by roller bearings 37a, 37b. The first intermediate gear 34a of the intermediate shaft 34 is in mesh with the low-speed gear 33a. The second intermediate gear 34b is in mesh with the high-speed gear 35a. The output shaft 35 is arranged above the intermediate shaft 34, and outputs rotary torque. An axial one end portion 35b and axial other end portion (output end portion) 35c of the output shaft 35 are rotatably supported by roller bearings 38, 39, respectively.

With the above configuration, the speed of rotation of the main shaft 2 is increased in three steps by the gear ratio of the planet gear mechanism 31, the gear ratio between the low-speed gear 33a and the first intermediate gear 34a and the gear ratio between the second intermediate gear 34b and the high-speed gear 35a, and rotary torque is output from the output end portion 35c of the output shaft 35. That is, the speed of rotation of the main shaft 2 due to wind force is increased by the speed increaser 3 in three steps, and the rotation with an increased speed drives the generator 4.

The wind power generator 1 further includes an input rotor 5, an output rotor 6, a one-way clutch 7 and rolling bearings 8. The input rotor 5 is provided so as to be rotatable together with the output shaft 35 of the speed increaser 3. The output rotor 6 is provided so as to be rotatable together with the drive shaft 41 of the generator 4. The one-way clutch 7 is arranged between the input rotor 5 and the output rotor 6. The rolling bearings 8 are arranged on respective axial sides of the one-way clutch 7. The one-way clutch 7 and the rolling bearings 8 transmit rotation of the output shaft 35 to the drive shaft 41 via the input rotor 5 and the output rotor 6.

Figure 2:
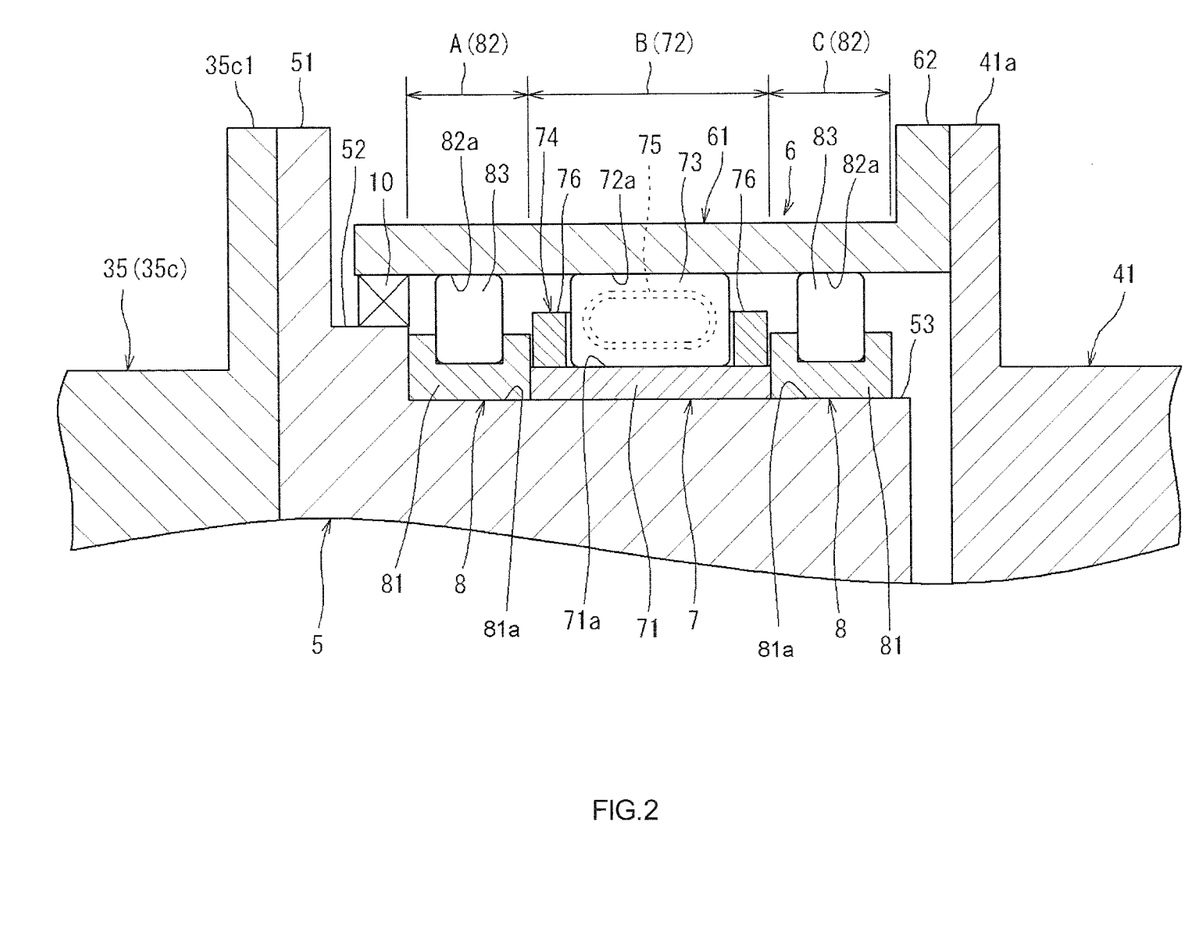
FIG. 2 is a sectional view that shows a coupling portion between an output shaft of a speed increaser and a drive shaft of a generator in the wind power generator according to the first embodiment of the invention.

FIG. 2 is a sectional view that shows the coupling portion between the output shaft 35 of the speed increaser 3 and the drive shaft 41 of the generator 4. In FIG. 2, the input rotor 5 is arranged concentrically with the output shaft 35, and has a flange portion 51, a large-diameter portion 52 and a small-diameter portion 53 in this order from the axial one end portion (left end portion in FIG. 2) toward the axial other end potion (right end portion in FIG. 2). The flange portion 51 is formed so as to extend radially outward beyond the outer periphery of the large-diameter portion 52, and is detachably fixed to the output end portion 35c of the output shaft 35. Specifically, the flange portion 51 is fixedly fastened to the flange portion 35c1 by bolts and nuts (not shown) in a state where the flange portion 51 is in contact with the flange portion 35c1 formed in the output end portion 35c.

The output rotor 6 is arranged concentrically with and radially outward of the input rotor 5. The output rotor 6 has a cylindrical portion 61 and a flange portion 62. The flange portion 62 is formed at the axial other end portion of the cylindrical portion 61. The output rotor 6 is arranged radially outward of the input rotor 5. Alternatively, the output rotor 6 may be arranged radially inward of the input rotor 5. In the present embodiment, the input rotor 5 and the output rotor 6 are provided as members that are formed separately from the output shaft 35 and the drive shaft 41, respectively. Alternatively, they may be formed integrally with the output shaft 35 and the drive shaft 41, respectively.

The flange portion 62 is formed so as to extend radially outward beyond the outer periphery of the cylindrical portion 61, and is detachably fixed to one end portion of the drive shaft 41. Specifically, the flange portion 62 is fixedly fastened to a flange portion 41a formed at the one end portion of the drive shaft 41 by bolts and nuts (not shown) in a state where the flange portion 62 is in contact with the flange portion 41a. The inner periphery of the cylindrical portion 61 is a cylindrical surface. An annular seal member 10 is provided in a clearance between the inner periphery of the axial one end portion of the cylindrical portion 61 and the outer periphery of the large-diameter portion 52 of the input rotor 5. The seal member 10 is used to hermetically seal an annular space between the cylindrical portion 61 and the small-diameter portion 53 of the input rotor 5.

The rolling bearings 8 each are arranged between the small-diameter portion 53 of the input rotor 5 and the cylindrical portion 61 of the output rotor 6, and support the input rotor 5 and the output rotor 6 such that the input rotor 5 and the output rotor 6 are rotatable relative to each other. Each rolling bearing 8 is, for example, formed of a cylindrical roller bearing. Each rolling bearing 8 includes an inner ring 81, an outer ring 82 and a plurality of cylindrical rollers 83 rollably arranged between the inner ring 81 and the outer ring 82. A region A and a region C at respective axial end portions of the cylindrical portion 61 in the output rotor 6 serve as the outer rings 82 of the rolling bearings 8. Outer ring raceway surfaces 82a of the outer rings 82 are formed on the inner peripheries of the regions A, C, respectively. The cylindrical rollers 83 are rollably arranged between each outer ring raceway surface 82a and a corresponding inner ring raceway surface 81a formed on the outer periphery of each inner ring 81.

Figure 3:
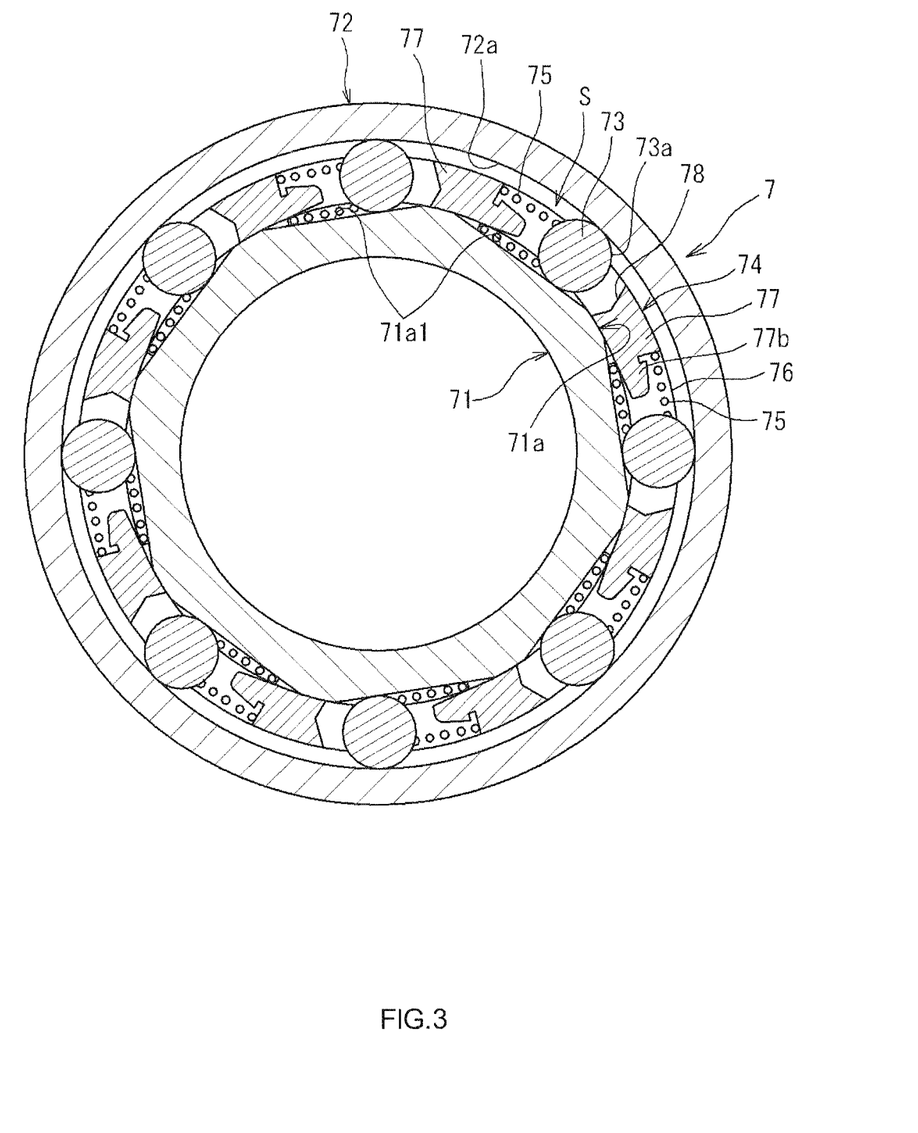
FIG. 3 is a sectional view that shows the one-way clutch according to the first embodiment of the invention.

FIG. 3 is a sectional view that shows the one-way clutch 7. In FIG. 2 and FIG. 3, the one-way clutch 7 includes an inner ring 71, an outer ring 72, a plurality of rollers 73, a cage 74 and a plurality of elastic members 75. The rollers 73 are arranged between an outer periphery 71a of the inner ring 71 and an inner periphery 72a of the outer ring 72. The cage 74 retains the rollers 73 at predetermined intervals in the circumferential direction. The elastic members 75 are attached to the cage 74, and elastically urge the corresponding rollers 73 in one direction.

The inner ring 71 is fixedly fitted to the outer periphery of the axial center portion of the small-diameter portion 53 of the input rotor 50, and rotates together with the small-diameter portion 53. A region B at the axial center portion of the cylindrical portion 61 of the output rotor 6 is used as the outer ring 72 of the one-way clutch 7. Thus, the inner periphery 72a is formed on the inner periphery of the region B of the cylindrical portion 61. The rollers 73 have a columnar shape, and the eight rollers 73 are arranged in the circumferential direction in the present embodiment. Each elastic member 75 is formed of a compression coil spring. Each elastic member 75 is individually accommodated in a corresponding one of pockets 78 (described later) of the cage 74. In the present embodiment, the output rotor 6 is used as the outer ring 72 of the one-way clutch 7 and the outer rings 82 of the rolling bearings 8. Alternatively, these outer rings 72, 82 may be provided as members formed separately from the output rotor 6.

In FIG. 3, flat cam surfaces 71a1 in the same number (eight) as the rollers 73 are formed on the outer periphery 71a of the inner ring 71, and the inner periphery 72a of the outer ring 72 is a cylindrical surface. A plurality of (eight) wedge-shaped spaces S is formed in the circumferential direction between the cam surfaces 71a1 of the inner ring 71 and the cylindrical surface of the outer ring 72. Each roller 73 is individually arranged in a corresponding one of the wedge-shaped spaces S. Each elastic member 75 urges the corresponding roller 73 in a direction in which the corresponding wedge-shaped space S is reduced. The outer periphery of each roller 73 serves as a contact surface 73a that contacts the corresponding cam surface 71a1 of the inner ring 71 and the cylindrical surface of the outer ring 72. The contact surface 73a is formed so as to extend straight in the width direction (axial direction). In the one-way clutch 7, grease that is lubricant is provided between the inner and outer rings 71, 72. The lubricant is made of ester as a base oil and urea-based material as a thickener, and is resistant to influence of a temperature change.

In the thus configured one-way clutch 7, when the input rotor 5 rotates at an increased speed and, as a result, the rotation speed of the input rotor 5 becomes higher than the rotation speed of the output rotor 6, the inner ring 71 attempts to rotate in one direction (clockwise direction in FIG. 3) relative to the outer ring 72. In this case, due to the urging force of the elastic members 75, the rollers 73 slightly move in a direction in which the wedge-shaped spaces S are narrowed, the contact surfaces 73a of the rollers 73 are pressed against the outer periphery 71a of the inner ring 71 and the inner periphery 72a of the outer ring 72, and the one-way clutch 7 is placed in a state where the rollers 73 are engaged with the inner and outer rings 71, 72. Thus, the inner and outer rings 71, 72 are rotatable together with each other in the one direction, so it is possible to connect the input rotor 5 to the output rotor 6 such that the input rotor 5 and the output rotor 6 are rotatable together with each other.

When the input rotor 5 rotates at a constant speed after rotating at an increased speed and, as a result, the rotation speed of the input rotor 5 becomes equal to the rotation speed of the output rotor 6, the rollers 73 are retained in a state where the rollers 73 are engaged with the inner and outer rings 71, 72. Therefore, in the one-way clutch 7, the inner ring 71 and the outer ring 72 are kept rotating together with each other in the one direction, and the input rotor 5 and the output rotor 6 continue rotating together with each other.

On the other hand, when the input rotor 5 rotates at a reduced speed and, as a result, the rotation speed of the input rotor 5 becomes lower than the rotation speed of the output rotor 6, the inner ring 71 attempts to rotate in the other direction (counterclockwise direction in FIG. 3) relative to the outer ring 72. In this case, when the rollers 73 slightly move against the urging force of the elastic members 75 in a direction in which the wedge-shaped spaces S become wider, the rollers 73 and the inner and outer rings 71, 72 are disengaged from each other. When the rollers 73 are disengaged from the inner and outer rings 71, 72 as described above, the inner ring 71 is allowed to rotate relative to the outer ring 72 in the other direction, and as a result, the input rotor 5 and the output rotor 6 are disconnected from each other.

Figure 4:
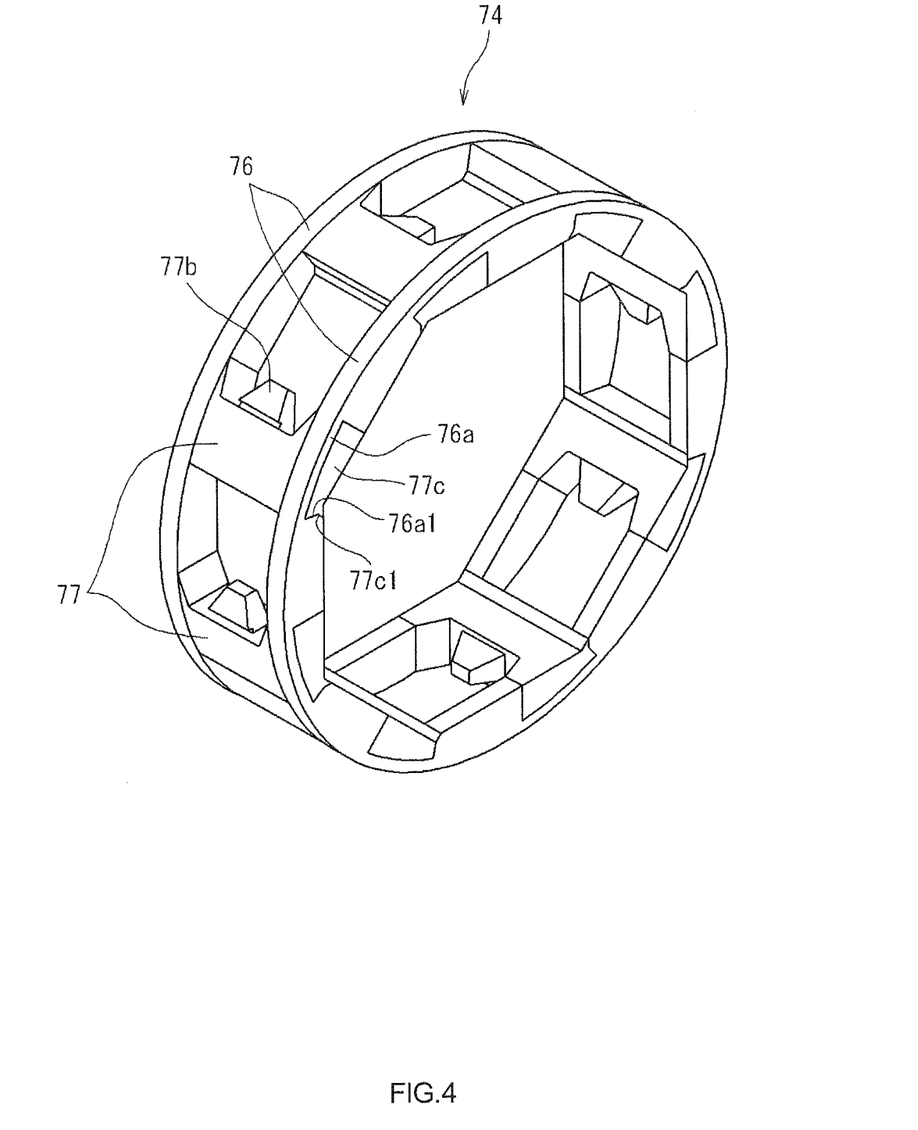
FIG. 4 is perspective view that shows a cage of the one-way clutch according to the first embodiment of the invention.

FIG. 4 is a perspective view that shows the cage 74 of the one-way clutch 7. In FIG. 4, the cage 74 includes a pair of axially facing annular portions 76 and a plurality of cage bar portions 77. The cage bar portions 77 are members formed separately from these annular portions 76, and both axial end portions of each of the cage bar portions 77 are fitted to respective annular portions 76. The pockets 78 each are formed by both annular portions 76 and any adjacent two cage bar portions 77. Each roller 73 is individually accommodated in the corresponding pocket 78 (see FIG. 3).

Figure 5:
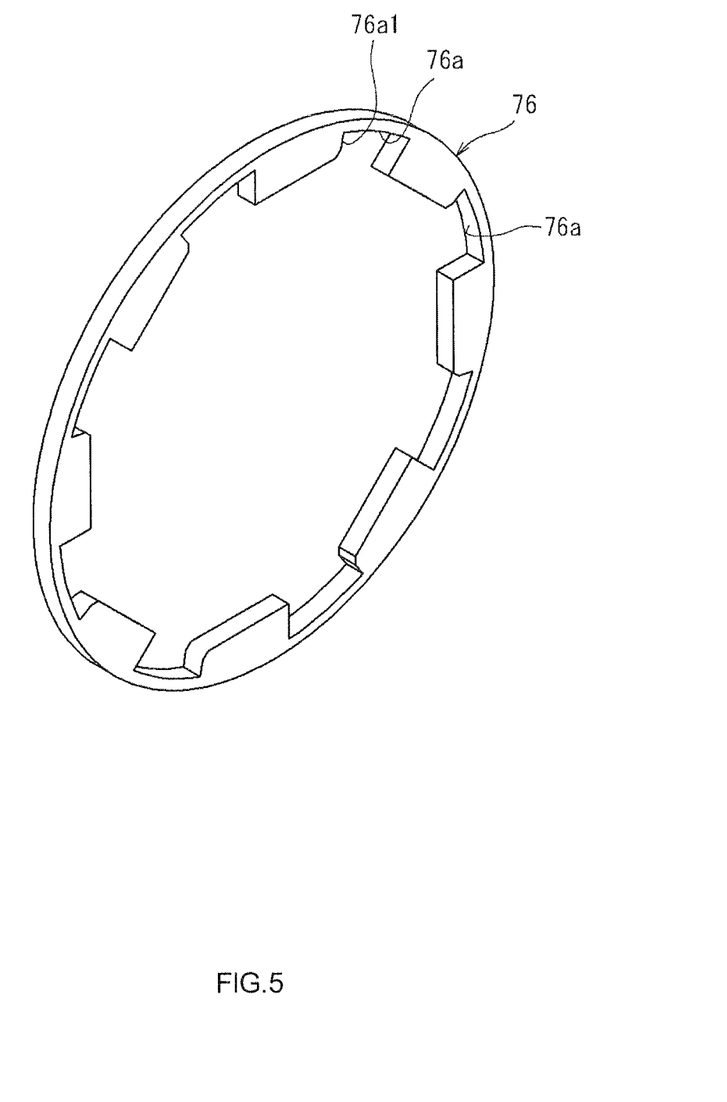
FIG. 5 is a perspective view that shows an annular portion of the cage according to the first embodiment of the invention.

FIG. 5 is a perspective view that shows one of the annular portions 76 of the cage 74. In FIG. 4, each annular portion 76 is made of a metal, such as carbon steel and aluminum, and, for example, has an outside diameter of 300 mm and an axial thickness of 15 mm. A plurality of recesses 76a is formed on the inner periphery of each annular portion 76 at predetermined intervals in the circumferential direction. A fitted face (fitted portion) 76a1 corresponding to the shape of a load receiving face 77c1 (described later) of the corresponding cage bar portion 77 is formed in each recess 76a.

Figure 6:
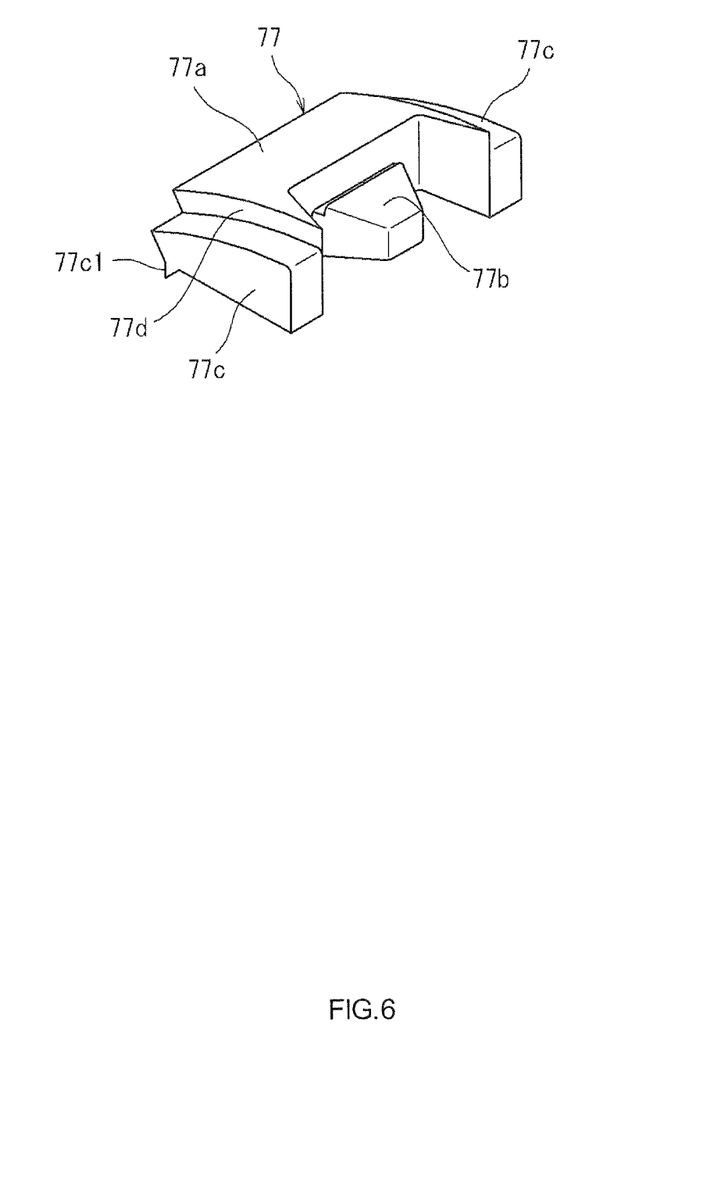
FIG. 6 is a perspective view that shows a cage bar portion of the cage according to the first embodiment of the invention.

FIG. 6 is a perspective view that shows each cage bar portion 77 of the cage 74. In FIG. 6, each cage bar portion 77 is integrally formed through injection molding of a synthetic resin material. Each cage bar portion 77 has a body portion 77a, a projecting portion 77b that protrudes from one circumferential end face of the body portion 77a and a pair of fitting portions 77c formed on respective axial end portions of the body portion 77a. As shown in FIG. 3, each projecting portion 77b serves as a guide at the time when the corresponding elastic member 75 is accommodated in the corresponding pocket 78. Specifically, each projecting portion 77b is formed so as to gradually narrow toward its distal end, and the elastic member 75 is loosely fitted from the distal end side of the projecting portion 77b.

In FIG. 6, each fitting portion 77c is formed such that the thickness of the fitting portion 77c in the radial direction (up-and-down direction in the drawing) is smaller than that of the body portion 77a. A step face 77d is formed between the outer periphery of each fitting portion 77c and the outer periphery of the body portion 77a. In addition, each load receiving face 77c1 is formed on one circumferential end face of the corresponding fitting portion 77c. Each load receiving face 77c1 receives an urging load of the corresponding elastic member 75. Each load receiving face 77c1 is formed in a V shape, and, as shown in FIG. 4, the load receiving face 77e1 is fitted to the fitted face 76a1 of the corresponding recess 76a of the annular portion 76 in a state where the fitting portion 77c of the cage bar portion 77 is fitted in the recess 76a. In this fitted state, each load receiving face 77c1 receives an urging load of the corresponding elastic member 75, which acts on the corresponding cage bar portion 77.

With the thus configured one-way clutch 7, the annular portions 76 and the cage bar portions 77, which constitute the cage 74, are formed as separate members, so it is possible to individually manufacture the annular portions 76 and the cage bar portions 77. Thus, in comparison with the case where the entire cage 74 is manufactured integrally as in the case of the related art, it is possible to easily manufacture the cage 74. In addition, the annular portions 76 are made of a metal, so it is possible to ensure the strength of each annular portion 76.

Figure 7:
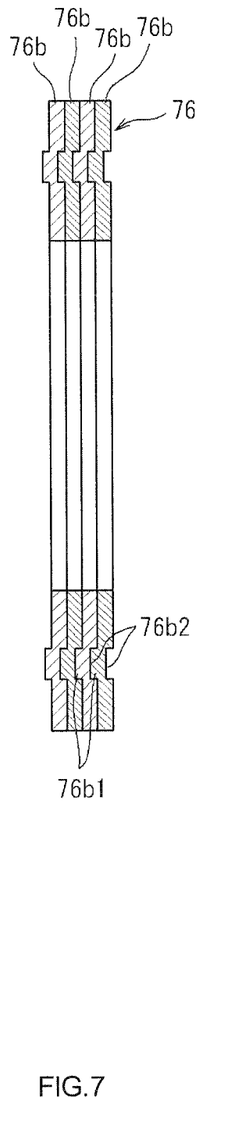
FIG. 7 is a sectional view that shows an annular portion of a cage in a one-way clutch according to a second embodiment of the invention.

FIG. 7 is a sectional view that shows each annular portion of a cage in a one-way clutch according to a second embodiment of the invention. In FIG. 7, each annular portion 76 according to the present embodiment is formed of a plurality of (four in the present embodiment) split plates 76b stacked in the axial direction. Each split plate 76b is made of a metal, such as carbon steel and aluminum, and is formed by pressing.

A protrusion 76b1 is formed on one axial side face of each split plate 76b, and a recess 76b2 is formed on the other axial side face corresponding to the protrusion 76b1. The split plates 76b that are mutually adjacent in the axial direction are fixed in a mutually stacked state by fitting the protrusion 76b1 of one of the split plates 76b to the recess 76b2 of the other one of the split plates 76b. The other configuration of the present embodiment is similar to that of the first embodiment, so the description thereof is omitted.

With the one-way clutch according to the present embodiment, each annular portion 76 of the cage 74 is formed of the split plates 76b stacked in the axial direction, so it is possible to reduce the thickness of each split plate 76b in the axial direction. Thus, by pressing each split plate 76b, it is possible to easily manufacture the annular portion 76.

Figure 8A:
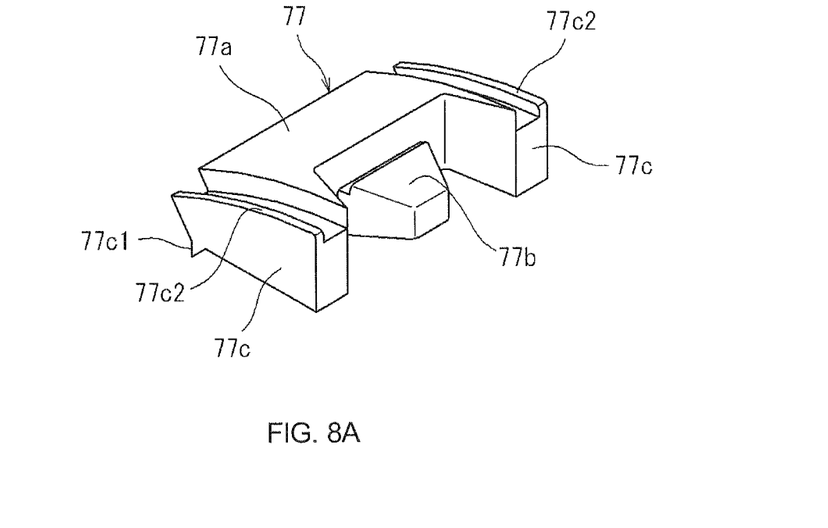
FIG. 8A is a perspective view that shows a cage bar portion of a cage in a one-way clutch according to a third embodiment of the invention.
Figure 8B:
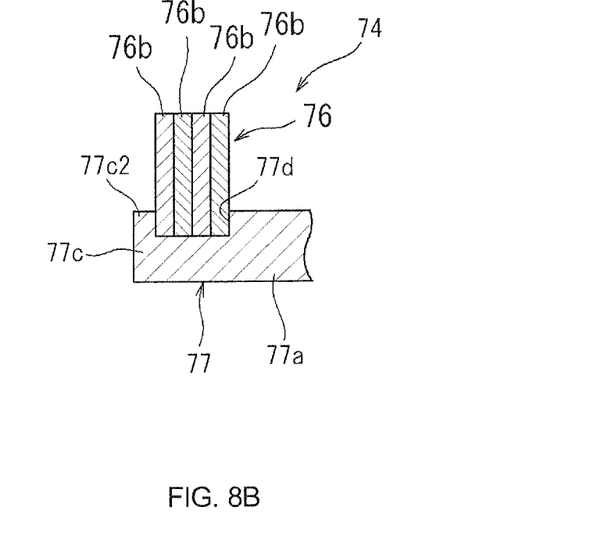
FIG. 8B is a sectional view of the cage in the one-way clutch according to the third embodiment of the invention.

FIG. 8A is a perspective view that shows each cage bar portion of a cage in a one-way clutch according to a third embodiment of the invention. FIG. 8B is a sectional view of the cage in the one-way clutch according to the third embodiment of the invention. In FIG. 8A and FIG. 8B, the one-way clutch according to the present embodiment shows a modified example of the cage 74 in the second embodiment. As shown in FIG. 8B, the cage 74 according to the present embodiment is similar to that of the second embodiment in that each annular portion 76 is formed of the plurality of split plates 76b stacked in the axial direction. However, the cage 74 according to the present embodiment differs from that of the second embodiment in that no protrusion and no recess are formed on both axial side faces of each split plate 76b of the present embodiment. Accordingly, in the cage 74 according to the present embodiment, the split plates 76b are held in a state where the split plates 76b are stacked, by changing the shape of each cage bar portion 77.

As shown in FIG. 8A, each cage bar portion 77 according to the present embodiment has a clinched portion 77c2 formed by clinching the axial outer end portion of each fitting portion 77c radially outward (upward in the drawing). Thus, by fitting each cage bar portion 77 to the corresponding recess 76a of each annular portion 76, the split plates 76b are sandwiched by the clinched portion 77c2 and the step face 77d from both sides in the axial direction in a state where the split plates 76b are stacked, as shown in FIG. 8B. Thus, the split plates 76b are held in a state where the split plates 76b are stacked. The other configuration of the present embodiment is similar to that of the first embodiment, so the description thereof is omitted.

With the one-way clutch according to the present embodiment, it is possible to reduce the axial thickness of each of the split plates 76b that constitute the annular portions 76 of the cage 74, so it is possible to easily manufacture each annular portion 76 by pressing each split plate 76b. In addition, it is not required to form a recess or a protrusion in each split plate 76b, so it is possible to further easily manufacture each annular portion 76.

Figure 9A:
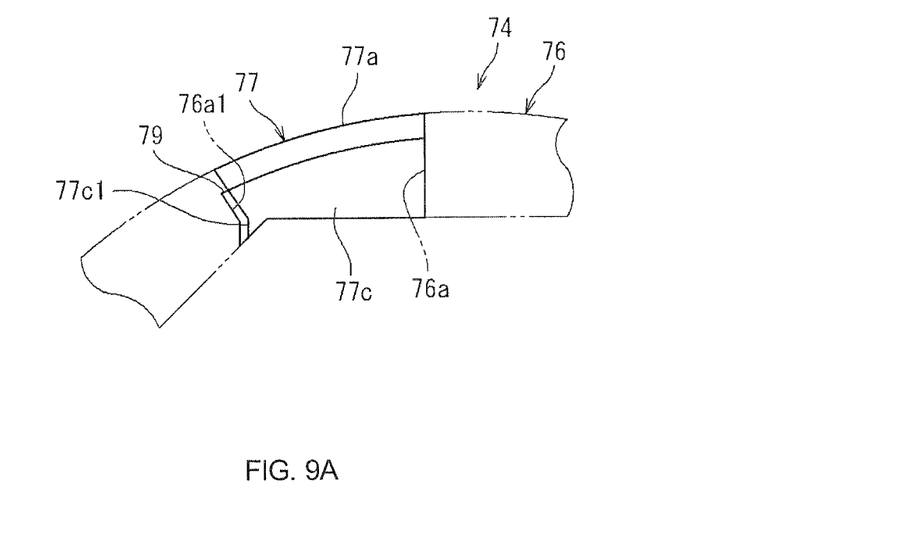
FIG. 9A is a side view of a cage in a one-way clutch according to a fourth embodiment of the invention.
Figure 9B:
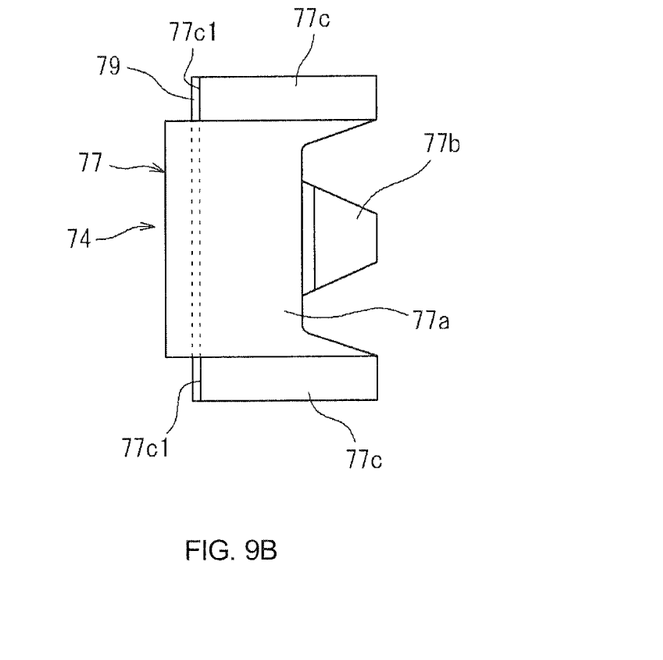
FIG. 9B is a plan view of the cage in the one-way clutch according to the fourth embodiment of the invention.

FIG. 9A is a side view that shows a cage in a one-way clutch according to a fourth embodiment of the invention. FIG. 9B is a plan view that shows the cage in the one-way clutch according to the fourth embodiment of the invention. In FIG. 9A and FIG. 9B, the one-way clutch according to the present embodiment differs from that of the first embodiment in that the cage 74 has metal plates 79. As shown in FIG. 9A, each metal plate 79 is interposed between the load receiving face 77c1 of the corresponding cage bar portion 77 and the corresponding fitted face 76a1 of each annular portion 76, and is formed in a V shape in accordance with the shape of the load receiving face 77c1 and the shape of the fitted face 76a1. Thus, the load receiving faces 77c1 and the fitted faces 76a1 are in plane contact with respective faces of each metal plate 79. Each metal plate 79 is held in a state where the metal plate 79 is sandwiched by the load receiving faces 77c1 and the fitted faces 76a1 by fitting the cage bar portion 77 to the recesses 76a of the annular portions 76.

Figure 10:
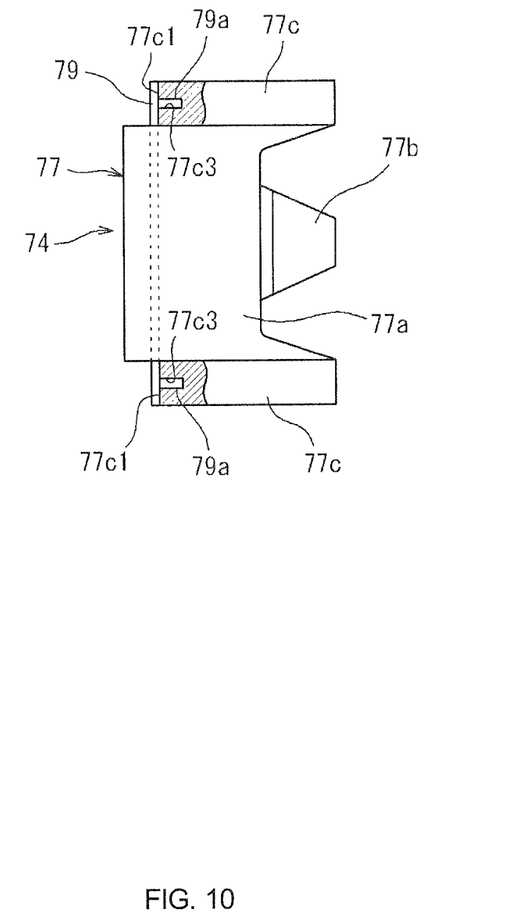
FIG. 10 is a plan view that shows a modified example of the cage shown in FIG. 9A and FIG. 9B.

As shown in FIG. 9B, each metal plate 79 is formed to extend over the entire axial length of the cage bar portion 77 along one circumferential end face of the cage bar portion 77, including the load receiving faces 77c1. The other configuration of the present embodiment is similar to that of the first embodiment, so the description thereof is omitted. In a modified example of the cage 74 according to the present embodiment, as shown in FIG. 10, engaging pins 79a may be protruded at respective axial end portions of each metal plate 79 and the engaging pins 79a may be engaged with engaging holes 77c3 that are formed at the respective load receiving faces 77c1 of each cage bar portion 77. In this case, it is possible to effectively prevent each metal plate 79 from slipping off from the cage 74.

With the one-way clutch according to the present embodiment, the metal plate 79 that extends over the entire axial length of the corresponding cage bar portion 77 is interposed between the load receiving faces 77c1 of the corresponding cage bar portion 77 and the fitted faces 76a1 of the annular portions 76. Therefore, it is possible to receive the urging load of each elastic member 75 by the load receiving faces 77c1 at both axial end portions of the corresponding cage bar portion 77 in a state where the urging load is distributed in the axial direction by the metal plate 79 that extends over the entire axial length of the cage bar portion 77. As a result, it is possible to reduce the urging load that acts on each of the load receiving faces 77c1 of each cage bar portion 77. Thus, it is possible to suppress breakage of each cage bar portion 77 due to the urging load of the corresponding elastic member 75.

The invention is not limited to the above-described embodiments. The invention may be implemented in forms modified from the above-described embodiments as needed. For example, in the one-way clutch 7 in the above-described embodiments, each annular portion 76 of the cage 74 is made of a metal. Alternatively, each annular portion 76 may be made of a synthetic resin. In this case, through injection molding of a synthetic resin material, it is possible to easily manufacture each annular portion 76. In addition, the power generating apparatus according to the above-described embodiments is illustrated as the wind power generator 1 that uses wind force as external force; instead, the invention may also be applied to a power generating apparatus that generates electric power by using other external force, such as hydraulic power and thermal power. Furthermore, the one-way clutch according to the invention may be applied to a device other than the power generating apparatus.

With the one-way clutch and the power generating apparatus according to the invention, it is possible to easily manufacture the cage.

What is claimed is:

1. A one-way clutch comprising:
    an inner ring;
    an outer ring;
    a plurality of rollers that is arranged between an outer periphery of the inner ring and an inner periphery of the outer ring, that allows the inner and outer rings to rotate together with each other in a state where the rollers are pressed against the inner and outer rings and are engaged with the inner and outer rings, and that allows the inner and outer rings to rotate relative to each other in a state where the rollers are disengaged from the inner and outer rings;
    a cage that retains the rollers at predetermined intervals in a circumferential direction; and
    a plurality of elastic members that is attached to the cage and that urges the corresponding rollers in a direction in which the rollers are pressed against the inner and outer rings, wherein
    the cage includes a pair of axially facing annular portions, and a plurality of cage bar portions formed separately from the annular portions, both axial end portions of each of the cage bar portions being fitted to the respective annular portions in corresponding recesses formed in the annular portion, and wherein
    the cage bar portions comprise load receiving faces formed at respective axial end portions of each of the cage bar portions, the load receiving faces receiving an urging load of the corresponding elastic member in a state where the cage bar portion is fitted to the annular portions, a fitted face of the annular portions corresponding to the shape of the load receiving face of the corresponding cage bar portion is formed in each recess, and each load receiving face is formed in a V shape.

2. The one-way clutch according to claim 1, wherein each of the annular portions is made of a metal.

3. The one-way clutch according to claim 1, wherein each of the annular portions is formed of a plurality of split plates stacked in an axial direction.

4. The one-way clutch according to claim 2, wherein each of the annular portions is formed of a plurality of split plates stacked in an axial direction.

5. The one-way clutch according to claim 1, wherein
    the cage has a metal plate that is interposed between the load receiving faces of each of the cage bar portions and corresponding fitted faces of the annular portions, and that extends over an entire axial length of the cage bar portion.

6. The one-way clutch according to claim 2, wherein
    the cage has a metal plate that is interposed between the load receiving faces of each of the cage bar portions and corresponding fitted faces of the annular portions, and that extends over an entire axial length of the cage bar portion.

7. The one-way clutch according to claim 3, wherein
    the cage has a metal plate that is interposed between the load receiving faces of each of the cage bar portions and corresponding fitted faces of the annular portions, and that extends over an entire axial length of the cage bar portion.

8. The one-way clutch according to claim 4, wherein
    the cage has a metal plate that is interposed between the load receiving faces of each of the cage bar portions and corresponding fitted faces of the annular portions, and that extends over an entire axial length of the cage bar portion.

9. A power generating apparatus comprising:
    a main shaft that rotates due to external force;
    a speed increaser that includes a rotation transmission mechanism that receives rotation of the main shaft and increases speed of the rotation, an output shaft that outputs rotary torque of the rotation transmission mechanism;
    a generator that has a drive shaft that rotates upon reception of rotation of the output shaft of the speed increaser and that generates electric power due to rotation of a rotor that rotates together with the drive shaft; and
    a one-way clutch which is arranged between the output shaft of the speed increaser and the drive shaft of the generator, the one-way clutch comprising:
    an inner ring;
    an outer ring;
    a plurality of rollers that is arranged between an outer periphery of the inner ring and an inner periphery of the outer ring, that allows the inner and outer rings to rotate together with each other in a state where the rollers are pressed against the inner and outer rings and are engaged with the inner and outer rings, and that allows the inner and outer rings to rotate relative to each other in a state where the rollers are disengaged from the inner and outer rings;
    a cage that retains the rollers at predetermined intervals in a circumferential direction; and
    a plurality of elastic members that is attached to the cage and that urges the corresponding rollers in a direction in which the rollers are pressed against the inner and outer rings, wherein
    the cage includes a pair of axially facing annular portions, and a plurality of cage bar portions formed separately from the annular portions, both axial end portions of each of the cage bar portions being fitted to the respective annular portions in corresponding recesses formed in the annular portion, and wherein
    the cage bar portions comprise load receiving faces formed at respective axial end portions of each of the cage bar portions, the load receiving faces receiving an urging load of the corresponding elastic member in a state where the cage bar portion is fitted to the annular portions, a fitted face of the annular portions corresponding to the shape of the load receiving face of the corresponding cage bar portion is formed in each recess, and each load receiving face is formed in a V shape.

10. A power generating apparatus according to claim 9, wherein each of the annular portions of the one-way clutch is made of metal.

11. A power generating apparatus according to claim 9, wherein each of the annular portions of the one-way clutch is formed of a plurality of split plates stacked in an axial direction.

12. A power generating apparatus according to claim 11, wherein each of the annular portions is formed of a plurality of split plates in an axial direction.

13. A power generating apparatus according to claim 9, wherein the cage of the one-way clutch has a metal plate that is interposed between the load receiving faces of each of the cage bar portions and corresponding fitted faces of the annular portions, and that extends over an entire axial length of the cage bar portion.

\* \* \* \* \*